US011948214B1

(12) United States Patent
Hammill et al.

(10) Patent No.: US 11,948,214 B1
(45) Date of Patent: Apr. 2, 2024

(54) METHOD OF CREATING AND MANAGING RESIDENTIAL NET LEASES BETWEEN THE OWNERS OF THE RENTAL PROPERTIES AND THE RENTERS OF THE PROPERTY

(71) Applicant: Capview Partners, LLC, Dallas, TX (US)

(72) Inventors: John Hammill, Dallas, TX (US); Kevin Connelly, Dallas, TX (US); Danilo da Silva, Dallas, TX (US)

(73) Assignee: CAPVIEW PARTNERS, LLC, Dallas, TX (US)

( * ) Notice: Subject to any disclaimer, the term of this patent is extended or adjusted under 35 U.S.C. 154(b) by 0 days.

(21) Appl. No.: 18/125,439

(22) Filed: Mar. 23, 2023

Related U.S. Application Data

(60) Provisional application No. 63/435,473, filed on Dec. 27, 2022.

(51) Int. Cl.
  *G06Q 50/16* (2012.01)
  *G06Q 40/06* (2012.01)
  *G06Q 50/163* (2024.01)

(52) U.S. Cl.
  CPC .......... *G06Q 50/163* (2013.01); *G06Q 40/06* (2013.01)

(58) Field of Classification Search
  USPC ........................................................ 705/314
  See application file for complete search history.

(56) References Cited

U.S. PATENT DOCUMENTS

| | | | | |
|---|---|---|---|---|
| 2006/0190277 | A1* | 8/2006 | Zimmerman | ...... G06Q 30/0645 705/26.1 |
| 2014/0114837 | A1* | 4/2014 | Buczkowski | ...... G06Q 30/0241 705/38 |
| 2014/0365339 | A1* | 12/2014 | Hessen | ............. G06Q 30/0629 705/26.64 |
| 2022/0351722 | A1* | 11/2022 | Mandry | ................. G06F 40/40 |

FOREIGN PATENT DOCUMENTS

WO    WO-2014062935 A2 *    4/2014    ......... G06Q 30/0241

OTHER PUBLICATIONS

Dickey, Gabe, S. Blanke, and L. Seaton. "Machine learning in auditing." The CPA Journal 89.6 (2019): 16-21. (Year: 2019).*
PCT Application No. PCT/US2023/085913, International Search Report and Written Opinion dated Feb. 15, 2024.

* cited by examiner

*Primary Examiner* — Michael Young
(74) *Attorney, Agent, or Firm* — Polsinelli LLP

(57) ABSTRACT

The present disclosure provides a method of creating and managing residential net leases in which a net lease network determines the parameters of a residential net lease for properties located in certain regions, cities, or towns. The net lease network autopopulates approved terms to generate a residential net lease agreement document. The net lease network record, in a reserve database, accounting for amounts remunerated to respective owners and collected from respective tenants per a rent schedule and accountings for amounts remunerated to investors based on determined profit margins over term of lease.

14 Claims, 12 Drawing Sheets

| Location | Starting Market Rent | Growth Rate | Inflation | Vacancy Rate | Rent Collectability | Home Price Appreciation | Operating Expenses |
|---|---|---|---|---|---|---|---|
| Boston, MA | $4.60/sq.ft. | 9% | 7.70% | 0.47% | 96% | 8.11% | BostonOE.Data |
| New York, NY | $9.00/sq.ft. | 10% | 7.70% | 1.20% | 92% | 12% | NewYorkOE.Data |
| Los Angeles, CA | $7.00/sq.ft. | 8% | 7.70% | 3% | 91% | 10% | LosAngelesOE.Data |
| | | | | | | | |
| | | | | | | | |

FIG. 8

| Property Owner ID | Property ID | Lease Length | Lease Payment | Lease Payment Increase | Fixed Costs | Rent Collected | Monthly Profits |
|---|---|---|---|---|---|---|---|
| JS123 | JS123-001 | 15 years | $2,000/month | 1% | $100/month | $2,500/month | $400 |
| JS123 | JS123-002 | 14 years | $2,200/month | 1% | $110/month | $2,700/month | $390 |
| JS123 | JS123-003 | 14 years | $1,800/month | 1.50% | $90/month | $2,300/month | $410 |
| TM456 | TM456-001 | 12 years | $3,000/month | 2% | $150/month | $3,700/month | $550 |
| TM456 | TM456-002 | 12 years | $2,500/month | 1.50% | $125/month | $3,200/month | $575 |
| TM456 | TM456-003 | 10 years | $2,800/month | 1.50% | $135/month | $3,400/month | $465 |
| HY789 | HY789-001 | 15 years | $2,300/month | 1% | $115/month | $2,900/month | $485 |
| HY789 | HY789-002 | 10 years | $2,200/month | 1% | $110/month | $2,800/month | $490 |
| HY789 | HY789-003 | 10 years | $2,500/month | 1.50% | $125/month | $3,100/month | $475 |

FIG. 9

| Name | Owner ID | Property ID | Address | Square Footage | Bedrooms | Bathrooms |
|---|---|---|---|---|---|---|
| John Smith | JS123 | JS123-001 | 123 main street, Boston, MA | 1,200 sq.ft. | 2 | 1 |
| John Smith | JS123 | JS123-002 | 34 elm street, Boston, MA | 800 sq.ft. | 1 | 1 |
| John Smith | JS123 | JS123-003 | 15 Maple Drive, Boston, MA | 1,500 sq.ft. | 3 | 2 |
| : | : | : | : | : | : | : |
| : | : | : | : | : | : | : |

| Location | Square Footage Range | Bedrooms | Bathrooms | Rent Range | Fixed Cost Range | Potential Profit Range |
|---|---|---|---|---|---|---|
| Boston, MA | 600-800 | Studio | 1 | $1,600-$2,000 | $80-$120 | $300-$500 |
| Boston, MA | 800-1,000 | 1 | 1 | $1,800-$2,200 | $100-$130 | $400-$600 |
| Boston, MA | 1,000-1,200 | 2 | 1 | $2,200-$2,700 | $110-$150 | $500-$600 |
| : | : | : | : | : | : | : |
| : | : | : | : | : | : | : |
| : | : | : | : | : | : | : |

FIG. 11

METHOD OF CREATING AND MANAGING RESIDENTIAL NET LEASES BETWEEN THE OWNERS OF THE RENTAL PROPERTIES AND THE RENTERS OF THE PROPERTY

CROSS-REFERENCE TO RELATED APPLICATIONS

This application claims priority from U.S. provisional application 63/435,473 filed Dec. 27, 2022, the disclosure of which is incorporated herein by reference.

FIELD OF THE DISCLOSURE

The present disclosure is generally related to creating and managing residential net leases between owners of the rental property and the property renters.

BACKGROUND

It is difficult for property owners and people who want to become property owners to rent out their residential properties due to the amount of time, expertise, and financial commitment it takes to identify and evaluate properties to acquire for investment and to make residential rentals profitable. Also, property owners need to be responsible for a plethora of expenses that come with renting out residential properties that, reduce income, and may even require additional capital to cover. Lastly, renters have varying levels of credit and financial resources, potentially leaving property owners with lost rental income in the event that their residential rental property is vacant, has bad tenants that do not pay rent, has tenants that fall behind on rent, etc., leaving the property owner in a position to lose money. Thus, there is a need in the prior art to create and manage residential net leases between owners of the rental property and the renters of the property.

DESCRIPTIONS OF THE DRAWINGS

FIG. 8 illustrates an Expenses Database in accordance with some aspects of the present technology.

FIG. 9 illustrates a Lease database in accordance with some aspects of the present technology.

FIG. 10 illustrates an Owners Database in accordance with some aspects of the present technology.

FIG. 11 illustrates a Parameters Database in accordance with some aspects of the present technology.

SUMMARY

Figure 1:
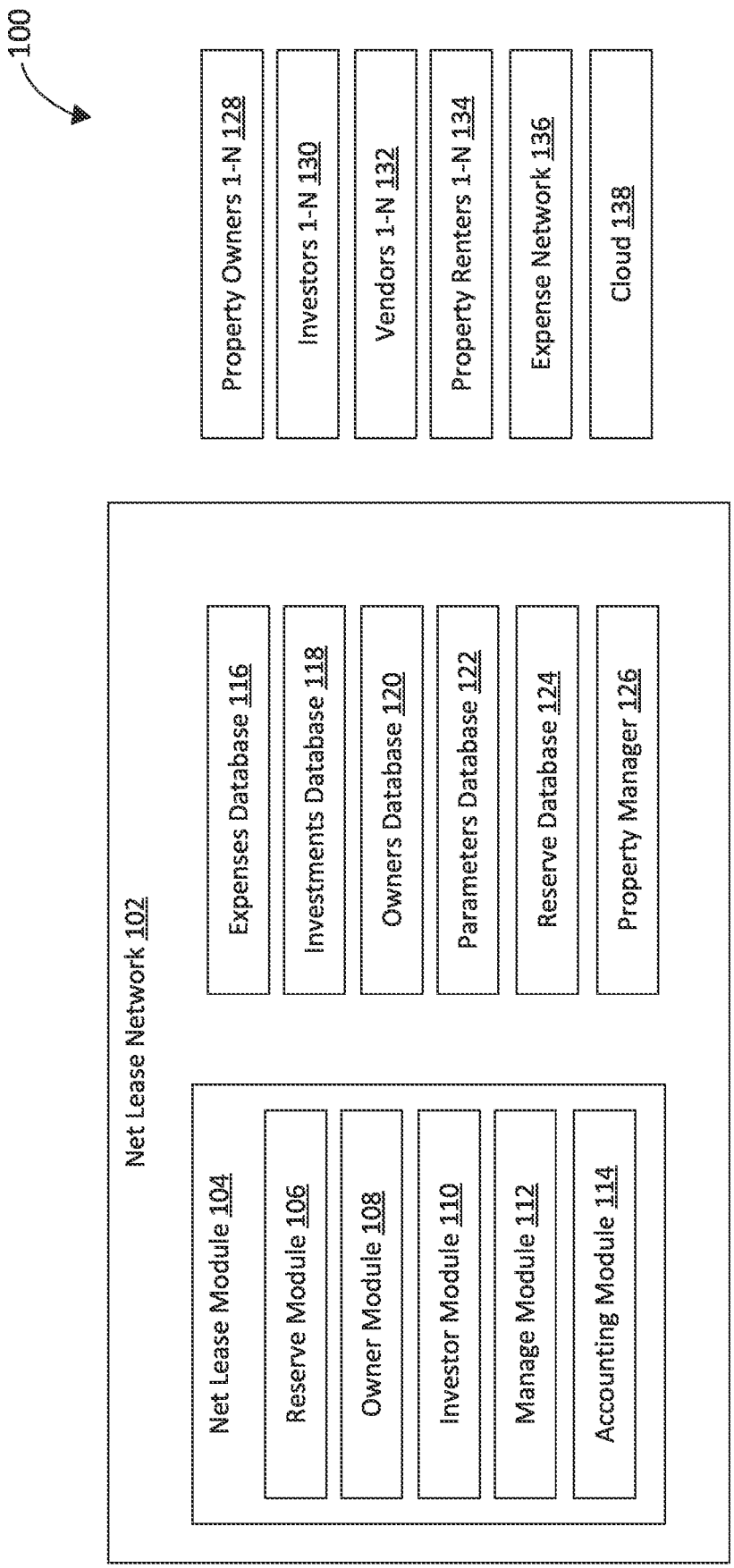
FIG. 1 illustrates a method of creating and managing residential net leases in accordance with some aspects of this disclosure of the present technology.

Disclosed are systems, apparatuses, methods, computer readable medium, and circuits for automating a residential net lease agreement documentation process. According to at least one example, a method includes: receiving market data associated with a specific region sent over a communication network at a net lease management server configured to communicate with at least one third-party application; generating net lease parameters for the specific region based on a calculated profitability evaluation that determines a threshold margin based on a percentage of an average rental rate and average fixed costs in the specific region; identifying one or more properties that fall within the net lease parameters and respective one or more owners of the one or more properties; determining fixed and variable costs based on data associated with at least one of the identified properties and extracted data points from stored invoice data of associated vendors; generating a set of net lease terms associated with the at least one of the identified properties based on inputs including the determined fixed and variable costs, wherein weights are assigned to each input; receiving an approval from the respective owner regarding the net lease terms; auto-populating a contractual agreement document based on the approved net lease terms; receiving electronic signatures for the contractual agreement document; and generating a digitally-printed and signed version of the contractual agreement document. For example, the net lease system receives market data associated with a specific region sent over a communication network at a net lease management server configured to communicate with at least one third-party application; generates net lease parameters for the specific region based on a calculated profitability evaluation that determines a threshold margin based on a percentage of an average rental rate and average fixed costs in the specific region; identifies one or more properties that fall within the net lease parameters and respective one or more owners of the one or more properties; determines fixed and variable costs based on data associated with at least one of the identified properties and extracted data points from stored invoice data of associated vendors; generates a set of net lease terms associated with the at least one of the identified properties based on inputs including the determined fixed and variable costs, wherein weights are assigned to each input; receives an approval from the respective owner regarding the net lease terms; auto-populates a contractual agreement document based on the approved net lease terms; receives electronic signatures for the contractual agreement document; and generates a digitally-printed and signed version of the contractual agreement document.

In another example, a net lease system for automating a residential net lease agreement documentation process is provided that includes a storage (e.g., a memory configured to store data, such as virtual content data, one or more images, etc.) and one or more processors (e.g., implemented in circuitry) coupled to the memory and configured to execute intructions and, in conjunction with various components (e.g., a network interface, a display, an output device, etc.), cause the net lease system to: receive market data associated with a specific region sent over a communication network at a net lease management server configured to communicate with at least one third-party application; generate net lease parameters for the specific region based on a calculated profitability evaluation that determines a threshold margin based on a percentage of an average rental rate and average fixed costs in the specific region; identify one or more properties that fall within the net lease parameters and respective one or more owners of the one or more properties; determine fixed and variable costs based on data associated with at least one of the identified properties and extracted data points from stored invoice data of associated vendors; generate a set of net lease terms associated with the at least one of the identified properties based on inputs including the determined fixed and variable costs, wherein weights are assigned to each input; receive an approval from the respective owner regarding the net lease terms; auto-populate a contractual agreement document based on the approved net lease terms; receive electronic signatures for the contractual agreement document; and generate a digitally-printed and signed version of the contractual agreement document.

DETAILED DESCRIPTION

Aspects of the present disclosure will be described more fully hereinafter with reference to the accompanying drawings in which like numerals represent like elements throughout the several figures, and in which example aspects of this disclosure are shown. Aspects of the claims may, however, be embodied in many different forms and should not be construed as limited to the aspects as set forth herein. The examples set forth herein are non-limiting examples and are merely examples among other possible examples.

FIG. 1 illustrates a method of creating and managing residential net leases. This method comprises a net lease system 100 inlcuding a net lease network 102, which may be a software system or process to calculate a long-term net lease amount accounted for as a payment amount to property owners 128 of residential rental properties for a 15 to 25-year primary term and provides landlords with more net operating income for the first five to nine years in exchange for an up-front initial lease reserve fee that in combination with rents received from renters, allows the lessee to absorb all property level expenses and meet the agreed terms of the lease and make all net lease amounts.

The absolute net lease means that the lessee pays the landlord (lessor) a fixed lease payment with annual escalations according to a lease payment schedule in exchange for full control and uninterrupted rights to the property as if it were owned by the lessee for the period of the primary lease term and any renewal options it executes. These rights include the right to rent the property to sub-tenants/renters to generate rental income. The lessee is responsible for all property-level expenses including, but not limited to, taxes, insurance, maintenance, utilities, capital expenditures, replacement and repair of FF&E and real property, management, etc.

Further, aspects of this disclosure may include a net lease module 104, which begins by connecting to the expenses network 136. The net lease module 104 receives the data from the expenses network 136. The net lease module 104 stores the data from the expenses network 136 in the expenses database 116. The net lease module 104 initiates the reserve module 106. The net lease module 104 initiates the owner module 108. The net lease module 104 initiates the investor module 110. The net lease module 104 extracts the first owner from the owner database 120. The net lease module 104 connects to the vendors 132. The net lease module 104 determines the fixed and variable costs for the property. The net lease module 104 then creates the net lease terms for the property owner.

The net lease module 104 determines if the property owner 128 approved of the net lease terms. If it is determined that the property owner 128 approved of the net lease terms, the net lease module 104 assigns a property manager 126 to the property. The net lease module 104 stores the data in the lease database 118. If it is determined that the property owner 128 did not approve of the net lease terms or after the data is stored in the lease database 118 the net lease module 104 determines if there are any property owners 128 remaining in the owner database 120. If it is determined that more owners are remaining in the owner database 120, the net lease module 104 extracts the next owner from the owner database 120, and the process returns to connecting to the vendors 132. If it is determined that there are no more owners remaining in the owner database 120, the net lease module 104 initiates the manage module 112. Then the net lease module 104 initiates the accounting module 114, and the process returns to connecting to the expenses network 136.

Further, aspects of this disclosure may include a reserve module 106, which begins by being initiated by the net lease module 104. The reserve module 106 extracts the first region from the expenses database 116. The reserve module 106 creates the region's net lease parameters. The reserve module 106 stores the parameters in the parameters database 122. The reserve module 106 determines if there are any more regions remaining in the expenses database 116. If it is determined that there are more regions remaining in the expenses database 116, the reserve module 106 extracts the next region from the expenses database 116 and the process returns to creating the parameters for the net lease for the region. If it is determined that there are no more regions remaining in the expenses database 116, the reserve module 106 returns to the net lease module 104. I Further, aspects of this disclosure may include an owner module 108, which begins by being initiated by the net lease module 104. The owner module 108 connects to the property owners 128. The owner module 108 identifies the potential property owners that may have a property that is within the parameters for a net lease. In some cases, generating net lease parameters for the specific region may be based on a calculated profitability evaluation that determines a threshold margin based on a percentage of an average rental rate based on square footage and average fixed costs in the specific region.

The owner module 108 sends a notification to the property owners 128 that have a property that fulfills the parameters for a net lease. The owner module 108 determines if the owner approved the notification. If the owner approved of the notification the owner module 108 receives the property details from the property owner 128. The owner module 108 stores the data in the owner database 120. if it is determined that the owner did not approve of the notification or after the data is stored in the owner database 120, the owner module 108 returns to the net lease module 104.

Further, aspects of this disclosure may include an investor module 110, initiated by the net lease module 104. The investor module 110 connects to the investors 130. The investor module 110 identifies potential investors for investment into the reserve database 124. The investor module 110 sends a notification to the investors 130. The investor module 110 receives the investment from the investors 130. The investor module 110 stores the received investment from the investors 130 in the reserve database 24. The investor module 110 returns to the net lease module 104.

Further, aspects of this disclosure may include a manage module 112, which begins by being initiated by the net lease module 104. The manage module 112 extracts the first data entry in the lease database 118. The manage module 112 determines the fixed and variable costs for the property. The manage module 112 pays the costs of the property. The manage module 112 collects rent from the renters 134. The manage module 112 stores the rent in the reserve database 124. The manage module 112 determines if there are more data entries remaining in the lease database 118. If it is determined that there are more data entries remaining in the lease database 118, the manage module 112 extracts the next data entry from the lease database 118. If it is determined that there are no more data entries remaining in the lease database 118, the manage module 112 returns to the net lease module 104.

Further, aspects of this disclosure may include an accounting module 114, initiated by the net lease module 104. The accounting module 114 determines the accounting for an amount remunerated to the property owners 128 determined based on the net lease terms. The accounting module 114 sends the accounting information to the property owners 128. The accounting module 114 determines the returns on investment of the residential investments. The accounting module 114 sends the accounting for the returns on investment of the residential investments to the investors 130. The accounting module 114 returns to the net lease module 104.

Further, aspects of this disclosure may include an expenses database 116, which contains the location of where the market data may be for the starting market rent, the market growth rate, the inflation rate, the vacancy rate, the rent collectability rate, the home price appreciation, the operating expenses which are stored as a data file and may contain the local taxes, including property taxes and fees, the insurance rates, the management fees, the maintenance budget, the homeowners association fees, the cost of utilities, and the asset management fees. In some aspects, the market data may be for a specific location or region or may be specific to a certain property location. In some aspects, each of the data points stored in the database may be used as an input into an algorithm to determine the net lease terms for the property owner 128, determine the rent for the specific property, and determine the profits or return on investment for the investors 130. In some aspects, the starting market price may be the cost per square footage, the average cost of rent in a certain location, the average cost of rent in a certain location based on the number of bedrooms, the average cost of rent in a certain region of a city or town, etc. In some aspects, the net lease module 104 may send a request to the expenses network 136 to receive relevant data points for a specific property location, for example, by using the mailing address.

Further, aspects of this disclosure may include a lease database 118, which contains a property owner ID, the property ID, the length of the lease or the years remaining on the net lease, the accounting for the lease amount remunerated to the property owner 128, the annual increase of the accounting for the net lease amount remunerated to the property owner 128, the fixed costs per month for the property, the rent collected per month for the property, and the monthly profits for the property. In some aspects, a property owner 128 may have multiple properties under a net lease with the net lease network 102. In some aspects, the fixed and variable costs may be different for each property, or if there are multiple properties located within a certain radius, there may be one vendor 132 and/or one property manager 126 for each of the properties to lower the monthly fixed and variable costs. In some aspects, the database may be shown as monthly, quarterly, or annual payments, expenses, profits, etc. In some aspects, the investors 130 may receive a percentage of the monthly profits or may be paid out based on quarterly or annual profits.

Further, aspects of this disclosure may include an owners database 120, which contains the list of owners interested in receiving net lease terms from the net lease network 102. The database contains the owner's name, the owner ID, the property ID, the property address, the square footage, the number of bedrooms, and the number of bathrooms. In some aspects, the owner may send the net lease network 102 more data on the location, such as average utility bills, property tax, insurance costs, condition of the property, condition of current appliances, etc. In some aspects, the owner may send the net lease network 102 the current rates they charge for rent, if the property is vacant or if it currently has renters, the application process the owner uses for renters, etc.

Further, aspects of this disclosure may include a parameters database 122, which contains the parameters created during the process described in the reserve module 106 that are used to determine if a potential property would be profitable for a residential net lease from the net lease network 102. The database contains the location or region, the square foot range of the property, the number of bedrooms, the number of bathrooms, the rent range that could be charged for the property, the average range of fixed and variable costs for the property, and the potential profit range of the property. In some aspects, the database may contain a plurality of locations based on the region of the country, the state the property resides in, the city where the property is located, the town or section of a city the property is located, etc. In some aspects, the parameters may be determined by the property's square footage, the number of bedrooms the property has, the rent that may be charged for the residential property, or a combination of the parameters.

Further, aspects of this disclosure may include a reserve database 124 in which the investors 130 investment is held in reserve in the event that the net lease networks 102 expenses are greater than the returns, or profits from the residential rental properties, to ensure payment to the property owners 128 according to the terms of their net lease. The reserve database 124 may also be used to expand a line of credit for the net lease network 102 to add more residential rental properties to the lease database 118 by attracting more property owners 128. The reserve database 124 may be funded entirely through the upfront fees paid by property owners 128. The calculation of the upfront fee paid by the property owner 128 may be based on an underwriting algorithm that identifies the relative risk of each property owner 128 and the market. In some aspects, the reserve database 124 may be stored and managed by a third party, such as a bank or financial institution. In some aspects, the reserve database 124 may be used for unexpected costs such as unexpected vacancy of the residential rental property, capital expenditures, variable costs, etc.

Further, aspects of this disclosure may include a plurality of property managers 126. For example, the property manager 126 may be required to find/evict tenants, deal with tenants, and coordinate with the net lease network 102. In addition, such arrangements may require the property manager 126 to collect rent and pay necessary expenses and taxes, making periodic reports to the owner, or the net lease network 102 may delegate specific tasks and deal with others directly. A property manager 126 may arrange for a wide variety of services, as may be requested by the net lease network 102, for a fee. Where a dwelling (vacation home, second home) is only periodically occupied, the property manager 120 might arrange for heightened security monitoring, house-sitting, storage and shipping of goods, and other local sub-contracting necessary to make the property comfortable for when a new tenant rents the property.

Further, aspects of this disclosure may include a plurality of property owners 128, which may be residential property owners that engage in a long-term net lease with the net lease network 102 to eliminate variability that comes with renting residential properties and decrease the time spent on making the residential rental property profitable. The long-term net lease with the net lease network 102 allows the property owner 128 to remove themselves from the responsibility of managing the property, paying taxes on the property, paying insurance on the property, maintaining the property, paying for utilities, paying for capital expenditures of the property, etc. and moving the responsibility to the net lease network 102 for the accounting, and in some cases the exchange of, net lease amount remunerated to the property owners allowing the net lease network 102 controlling rights of the property.

Further, aspects of this disclosure may include a plurality of investors 130, which provide an investment to the net lease network 102 to find residential properties to engage in long-term net leases in exchange for a percentage of the profits made by the net lease network on the residential properties as the return on the investment.

Further, aspects of this disclosure may include a plurality of vendors 132 which may be the source of where the property managers 126 are assigned to the various residential rental properties and take care of the management of the property, management of the leases for the tenants, manage the maintenance of the property, track and collect rent from the tenants, track and maintain the relationship with the tenants, and manage the vacancy of the residential property.

Further, aspects of this disclosure may include a plurality of property renters 134, which sign a rental agreement with the net lease network 102 to rent the residential property. The renters 134 may pay a monthly rental fee to live in the property, and the agreement may cover certain costs, such as heat, water, electricity, internet, etc. In some aspects, the net lease network 102 may use a plurality of vendors 132 to assign property managers 126 to the residential rental property to take care and maintain the property on behalf of the net lease network 102 while collecting rent fees, paying fixed and variable costs, and maintain the relationship with the renters 134.

Further, aspects of this disclosure may include an expenses network 136, which includes a plurality of market data for the properties engaged or about to be engaged in a long-term net lease with the net lease network 102. The expenses network 136 may contain data for specific locations, cities, regions, or states to allow the most up-to-date market data for the net lease network 102 to use to create the net lease terms. The expenses network 136 may contain, for each specific location, the starting market rent, the market growth rate, the inflation rate, the vacancy rate, the rent collectability rate, the home price appreciation, and the operating expenses, which are stored as a data file and may contain the local taxes, the insurance rates, the management fees, the maintenance budget, the homeowner's association fees, the cost of utilities, and the asset management fees. In some aspects, the expenses network 136 may be connected to a plurality of third-party networks to compile the market data. In some aspects, the expenses network 136 may continuously update the market data or may collect the specific market data based on a request from the net lease network 102. In some aspects, the expenses network 136 may store the market data in a plurality of databases to extract and send the data as it is requested from the net lease network 102.

Further, aspects of this disclosure may include a cloud 138, which is a distributed network of computers comprising servers and databases. A cloud 138 may be a private cloud 138, where access is restricted by isolating the network, preventing external access, or using encryption to limit access to only authorized users. Alternatively, a cloud 138 may be a public cloud 138 where access is widely available via the internet. A public cloud 138 may not be secured or may include limited security features.

Figure 2:
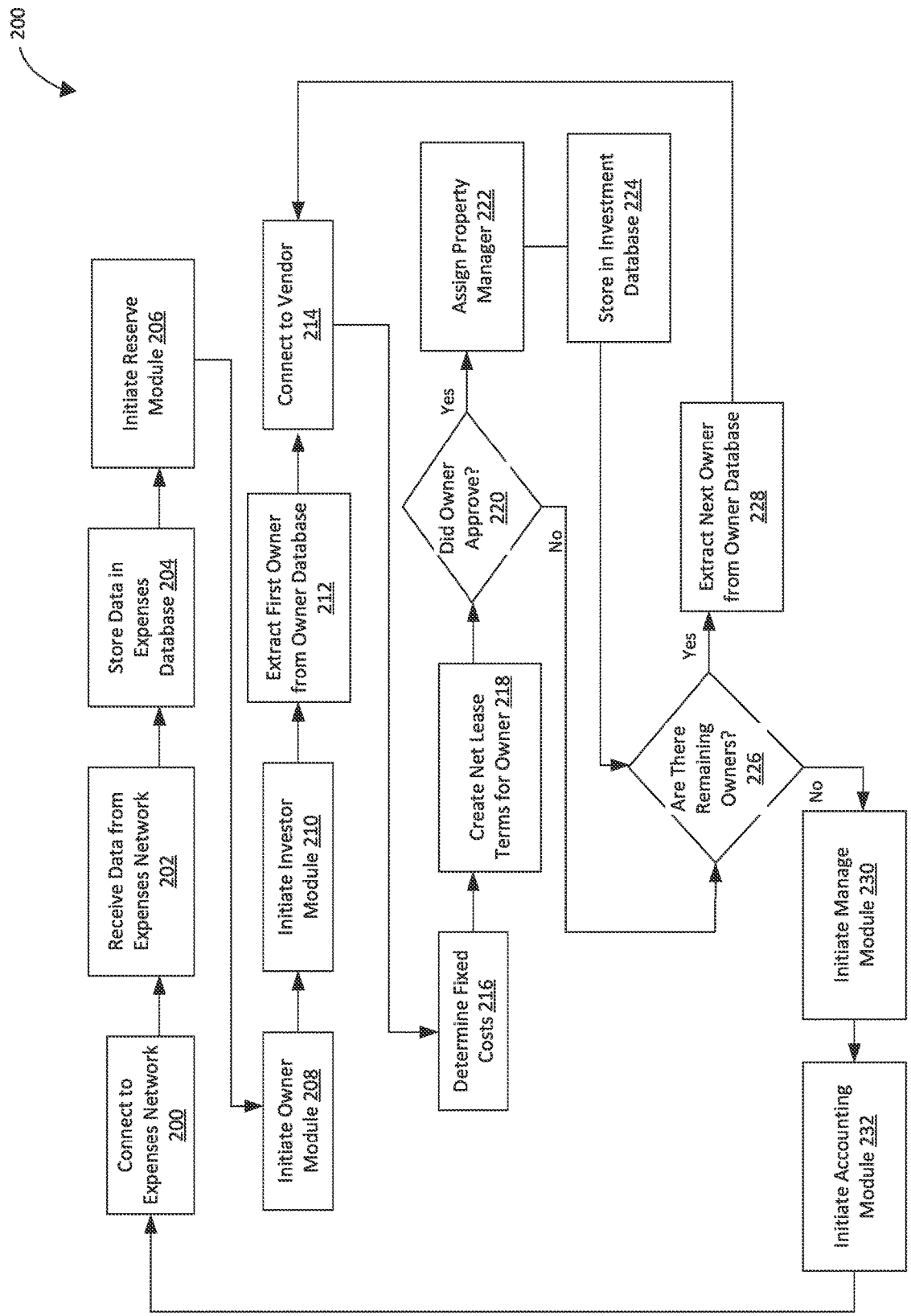
FIG. 2 illustrates a Net Lease Module in accordance with some aspects of the present technology.

FIG. 2 displays the net lease module 104. The process begins with the net lease module 104 connecting, at step 200, to the expenses network 136. For example, the net lease module 104 connects to the expenses network 136 through the cloud 138. In some aspects, the connection may include a request from the net lease module 104 to receive the market data stored in the expenses network 136. In some aspects, if the expenses network 136 connects to a plurality of third-party networks for the market data, the net lease module 104 may connect to each third-party network to request the market data individually. In some aspects, the request from the net lease module 104 may include a specific location, city, region, state, etc., for the desired market data.

The net lease module 104 receives, at step 202, the data from the expenses network 136. For example, the net lease module 104 receives the market data from the expenses network 136, such as the starting market rent, the market growth rate, the inflation rate, the vacancy rate, the rent collectability rate, the home price appreciation, the operating expenses which are stored as a data file and may contain the local taxes, the insurance rates, the management fees, the maintenance budget, the homeowner's association fees, the cost of utilities, and the asset management fees. The net lease module 104 stores, at step 204, the data from the expenses network 136 in the expenses database 116. For example, the net lease module 104 stores the market data in the expenses database 116, such as the starting market rent, the market growth rate, the inflation rate, the vacancy rate, the rent collectability rate, the home price appreciation, the operating expenses which are stored as a data file and may contain the local taxes, the insurance rates, the management fees, the maintenance budget, the homeowner's association fees, the cost of utilities, and the asset management fees.

The net lease module 104 initiates, at step 206, the reserve module 106. For example, the reserve module 106 begins by being initiated by the net lease module 104. The reserve module 106 extracts the first region from the expenses database 116. The reserve module 106 creates the region's net lease parameters. The reserve module 106 stores the parameters in the parameters database 122. The reserve module 106 determines if there are any more regions remaining in the expenses database 116. If it is determined that there are more regions remaining in the expenses database 116, the reserve module 106 extracts the next region from the expenses database 116, and the process returns to creating the parameters for the net lease for the region. If it is determined that there are no more regions remaining in the expenses database 116, the reserve module 106 returns to the net lease module 104.

The net lease module 104 initiates, at step 208, the owner module 108. For example, the owner module 108 begins by being initiated by the net lease module 104. The owner module 108 connects to the property owners 128. The owner module 108 identifies the potential property owners that may have a property that is within the parameters for a net lease. The owner module 108 sends a notification to the property owners 128 that have a property that fulfills the parameters for a net lease. The owner module 108 determines if the owner approved the notification. If the owner approves the notification, the owner module 108 receives the property details from the property owner 128. The owner module 108 stores the data in the owner database 120. if it is determined that the owner did not approve of the notification or after the data is stored in the owner database 120, the owner module 108 returns to the net lease module 104.

The net lease module 104 initiates, at step 210, the investor module 110. For example, the investor module 110 begins by being initiated by the net lease module 104. The investor module 110 connects to the investors 130. The investor module 110 identifies potential investors for investment into the reserve database 124. The investor module 110 sends a notification to the investors 130. The investor module 110 receives the investment from the investors 130. The investor module 110 stores the received investment from the investors 130 in the reserve database 124. The investor module 110 returns to the net lease module 104.

The net lease module 104 extracts, at step 212, the first owner from the owner database 120. For example, the net lease module 104 extracts the data entry for the first owner and the first property for the owner, such as the location of the property, the square footage, the number of bedrooms, and the number of bathrooms. In some aspects, the data may include the average cost of utilities, property tax, insurance costs, condition of the property, condition of current appliances, the current rates they charge for rent, if the property is vacant or if it currently has renters, the application process the owner uses for renters, etc. The net lease module 104 connects, at step 214, to the vendors 132. For example, the net lease module 104 connects to the vendors 132 through the cloud 138 to find the average fixed and variable costs for the vendors in the region, city, state, etc., the property is located.

In some aspects, the net lease module 104 may have a plurality of agreements with a plurality of vendors 132 in a plurality of locations to assign property managers to maintain the residential properties. The net lease module 104 determines, at step 216, the fixed and variable costs for the property. For example, the net lease module 104 may determine the fixed and variable costs for each of the properties, such as by invoices inputted by vendors 132 or by the property managers 126, extracting the operating expenses from the expense database 116, etc. The net lease module 104 creates, at step 218, the net lease terms for the property owner. For example, the net lease module 104 may determine the residential property's location and then use the data stored in the expenses database 116 as inputs into an algorithm that outputs the net lease payment terms for the property owner 128.

For example, if the residential rental property is located in Boston, MA, then the starting market rent, the market growth rate, the inflation rate, the vacancy rate, the rent collectability rate, the home price appreciation, the operating expenses such as the local taxes, the insurance rates, the management fees, the maintenance budget, the homeowners association fees, the cost of utilities, and the asset management fees would be used as inputs into the algorithm to determine the accounting for the net lease amount remunerated to the property owners.

For example, the algorithm may use the average rent per square footage, and the square footage of the property owners 128 residential property to determine the cost of rent for the property, such as the average rent per square foot is $4.50 in Boston, MA, and the property owners 128 property is 800 square feet, resulting in a rent price of $3,600 per month. The other inputs, such as the market growth rate, the inflation rate, the vacancy rate, the rent collectability rate, the home price appreciation, the operating expenses, etc., may be used in the algorithm as weighted averages or percentages to increase or decrease the rental rate of the property. The algorithm may offer the property owner 128 net lease terms based on a percentage of the possible rent that the net lease network 102 could charge tenants, such as 75% or $2,700 per month, over the length of 15 years, allowing the property owner 128 to be free of the responsibilities associated with renting a property and providing them with a steady return on investment for the residential rental property.

In some aspects, the property owner 128 may be offered an annual increase percentage of the net lease amount remunerated to the property owner due to inflation, market growth rate, etc. The net lease module 104 determines, at step 220, if the property owner 128 approved the net lease terms. For example, the property owner 128 may send the signed agreements back to the net lease module 104 or net lease network 102 to approve the net lease terms. In some aspects, the property owner 128 may have a login, such as a username and a password, account, access to the net lease network 102, etc., to approve the net lease terms. In some aspects, an administrator of the net lease network 102 may collect the signed agreements from the property owners 128 and store the data in the net lease network 102 to approve the net lease terms. If it is determined that the property owner 128 approved of the net lease terms, the net lease module 104 assigns, at step 222, a property manager 126 to the property. For example, the net lease module 104 may assign a property manager 126 to the residential property.

In some cases, a contractual agreement document may be auto-popualted based on the approved net lease terms. Electronic signatures for the contractual agreement document may be received and a digitally-printed and signed version of the contractual agreement document may be generated.

In some aspects, the property manager 126 may be assigned by one of the vendors 132, with which the net lease network 102 has an agreement. In some aspects, the property manager 126 may be a person or firm charged with operating a real estate property for a fee. For example, the property manager 126 may be required to find/evict tenants, deal with tenants, and coordinate with the net lease network 102. In addition, such arrangements may require the property manager 126 to collect rents and pay necessary expenses and taxes, making periodic reports to the owner, or the net lease network 102 may delegate specific tasks and deal with others directly.

The net lease module 104 stores, at step 224, the data in the lease database. For example, the net lease module 104 stores the data created from the net lease terms in the lease database 118, such as a property owner ID, the property ID, the length of the lease or the years remaining on the net lease, the lease amount remunerated to the property owner 128, the annual increase of the net lease amount remunerated to the property owner, the fixed and variable costs per month for the property, the rent collected per month for the property, etc. If it is determined that the property owner 128 did not approve of the net lease terms or after the data is stored in the lease database 118, the net lease module 104 determines, at step 226, if there are any property owners 128 remaining in the owner database 120. If it is determined that more owners are remaining in the owner database 120, the net lease module 104 extracts the next owner from the owner database 120, and the process returns to connecting to the vendors 132. If it is determined that no more owners remain in the owner database 120, the net lease module 104 initiates, at step 230, the manage module 112. For example, the manage module 112 begins by being initiated by the net lease module 104.

The manage module 112 extracts the first data entry in the lease database 118. The manage module 112 determines the fixed and variable costs for the property. Variable costs may include estimates of future capital expenditures needed on the property. The manage module 112 pays the costs of the property. The manage module 112 collects rent from the renters 134. The manage module 112 stores the rent in the reserve database 124. The manage module 112 determines if there are more data entries remaining in the lease database 118. If it is determined that there are more data entries remaining in the lease database 118, the manage module 112 extracts the next data entry from the lease database 118. If it is determined that there are no more data entries remaining in the lease database 118, the manage module 112 returns to the net lease module 104.

Then the net lease module 104 initiates, at step 232, the accounting module 114, and the process returns to connecting to the expenses network 136. For example, the accounting module 114 begins by being initiated by the net lease module 104. The accounting module 114 determines the account for an amount remunerated to the property owners 128. The accounting module 114 sends the accounting for the amount remunerated to the property owners 128. The accounting module 114 determines the profits of the residential investments. The accounting module 114 sends the profits of the residential investments to the investors 130. The accounting module 114 returns to the net lease module 104.

Figure 3:
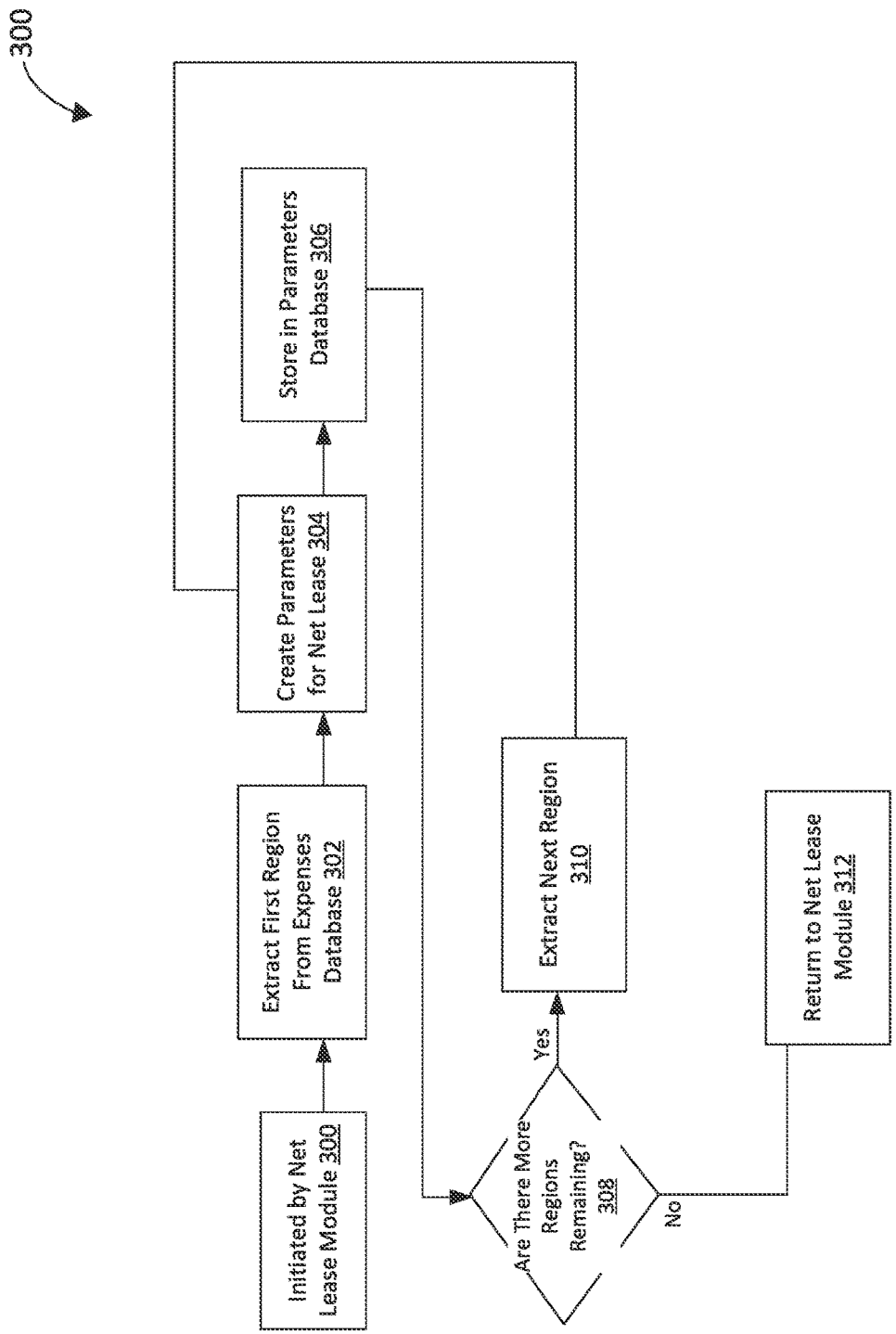
FIG. 3 illustrates a Reserve Module in accordance with some aspects of the present technology.

FIG. 3 displays the reserve module 106. The process begins with the reserve module 106 being initiated, at step 300, by the net lease module 104. In some aspects, the reserve module 106 may not need to be initiated and is continuously running in the background of the net lease network 102. The reserve module 106 extracts, at step 302, the first region from the expenses database 116. For example, the reserve module 106 extracts the first region from the expenses database 116, such as the state, city, town, etc., that the expenses data and market data are related to.

The reserve module 106 creates, at step 304, the parameters for the net lease for the region. For example, the reserve module 106 may use the data stored in the expenses database to create parameters for residential net leases to identify residential properties that would be profitable with a residential net lease. For example, if the reserve module 106 may calculate an average range that could be charged for rent depending on the cost per square foot, such as if renters in Boston, MA, typically pay $4.50 per square foot of a property and the average square footage of a studio apartment is 800 square feet to 1,000 square feet, the average rent for a studio apartment may be $3,600 to $4,500.

In some aspects, the calculations may incorporate the number of bedrooms and bathrooms to adjust the average rental rate based on square footage. In some aspects, the calculations may incorporate the area's average fixed costs of properties. In some aspects, the calculations may use the average rental rate and average fixed costs to determine the average profit of a rental property. In some aspects, the calculations may use a percentage of the average rental rate to determine the average amount remunerated to a property owner 128 to determine the profits, for example, if the average rent price was $3,600 a month. The owner 128 typically received a remunerated amount of 80% for a net lease agreement, then the calculations would subtract the 80% for the net lease and the fixed and variable costs to determine the average monthly profit of a residential rental property.

The reserve module 106 stores, at step 306, the parameters in the parameters database 122. For example, the reserve module 106 may store all the data from the calculating the parameters in the parameters database 122, such as the location or region, the square foot range of the property, the number of bedrooms, the number of bathrooms, the rent range that could be charged for the property, the average range of fixed and variable costs for the property, and the potential profit range of the property. The reserve module 106 determines, at step 308, if there are any more regions remaining in the expenses database 116. For example, if there are more regions, cities, towns, etc., in the expenses database 116, the reserve module 106 extracts the next region and processes the return to determine the region's parameters. If it is determined that more regions are remaining in the expenses database 116, the reserve module 106 extracts, at step 310, the next region from the expenses database 116, and the process returns to creating the parameters for the net lease for the region. If it is determined that there are no more regions remaining in the expenses database 116, the reserve module 106 returns, at step 312, to the net lease module 104.

Figure 4:
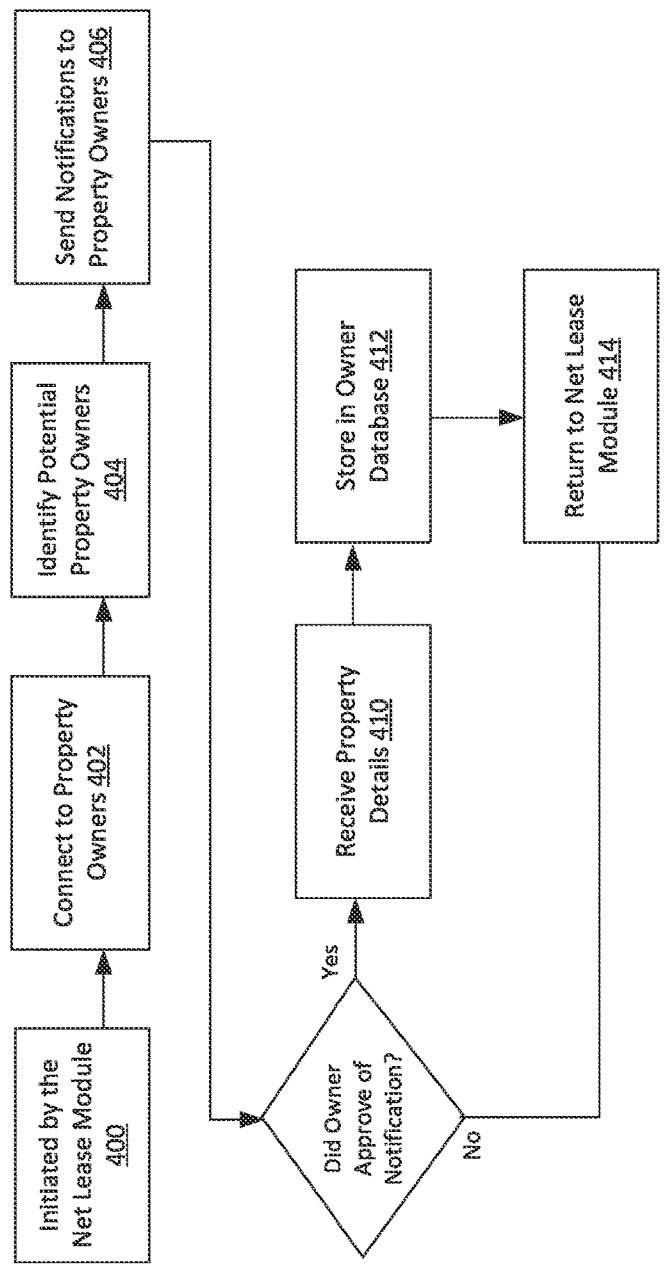
FIG. 4 illustrates an Owner Module in accordance with some aspects of the present technology.

FIG. 4 displays the owner module 108. The process begins with the owner module 108 being initiated, at step 400, by the net lease module 104. In some aspects, the owner module 108 may not need to be initiated and is continuously running in the background of the net lease network 102. The owner module 108 connects, at step 402, to the property owners 128. For example, the owner module 108 connects to the property owners 128 through the cloud 138, owners 128 may log in to the net lease network 102, sign up to the net lease network 102, etc. In some aspects, the owner module 108 may find potential property owners 128 through rental listings, apartment listings, etc., and offer the property owner 128 the net lease terms once they are created. In some aspects, the property owner 128 may be required to input their information, such as name, location of the residential rental property, e-mail address, etc., to receive the net lease terms from the owner module 108.

The owner module 108 identifies, at step 404, the potential property owners that may have a property that is within the parameters for a net lease. For example, the owner module 108 may identify residential properties that would be candidates for residential net leases by comparing the readily available data on the properties to the parameters stored in the parameter database 122. For example, the owner 128 may send data to the owner module 108, such as square footage, number of bedrooms, number of bathrooms, current rent, etc., and the owner module 108 compares the received data to the parameters database 122 to determine if the received data falls within the parameters. In some aspects, the owner module 108 may use third-party sources to extract the data on the residential properties to determine if the property falls within the range of the parameters stored in the parameter database 122.

The owner module 108 sends, at step 406, a notification to the property owners 128 that have a property that fulfills the parameters for a net lease. For example, if the residential property data is within the parameters of the parameter database 122, then the owner module 108 may send a notification, such as an e-mail, automated phone call, notification through the net lease network 102, etc., to the owner. In some aspects, the owner module 108 may send the owner an estimate of a potential net lease agreement. The owner module 108 determines, at step 408, if the owner approves the notification. For example, the owner module 108 determines if the owner 128 responds to the notification by e-mail, logging onto the net lease network 102, etc.

If the owner approves the notification, the owner module 108 receives, at step 410, the property details from the property owner 128. For example, the owner 128 sends the owner module the data related to the residential property, such as the square footage, number of bedrooms, number of bathrooms, current condition of the property, the current condition of the appliances, current rent, the current property management group, etc. The owner module 108 stores, at step 412, the data in the owner database 120. For example, the owner module 108 stores the received data in the owner database 120, such as the owner's name, the owner ID, the property ID, the property address, the square footage, the number of bedrooms, and the number of bathrooms, average utility bills, property tax, insurance costs, condition of the property, condition of current appliances, current rates they charge for rent, if the property is vacant or if it currently has renters, the application process the owner uses for renters, etc. if it is determined that the owner did not approve of the notification or after the data is stored in the owner database 120 the owner module 108 returns, at step 414, to the net lease module 104.

Figure 5:
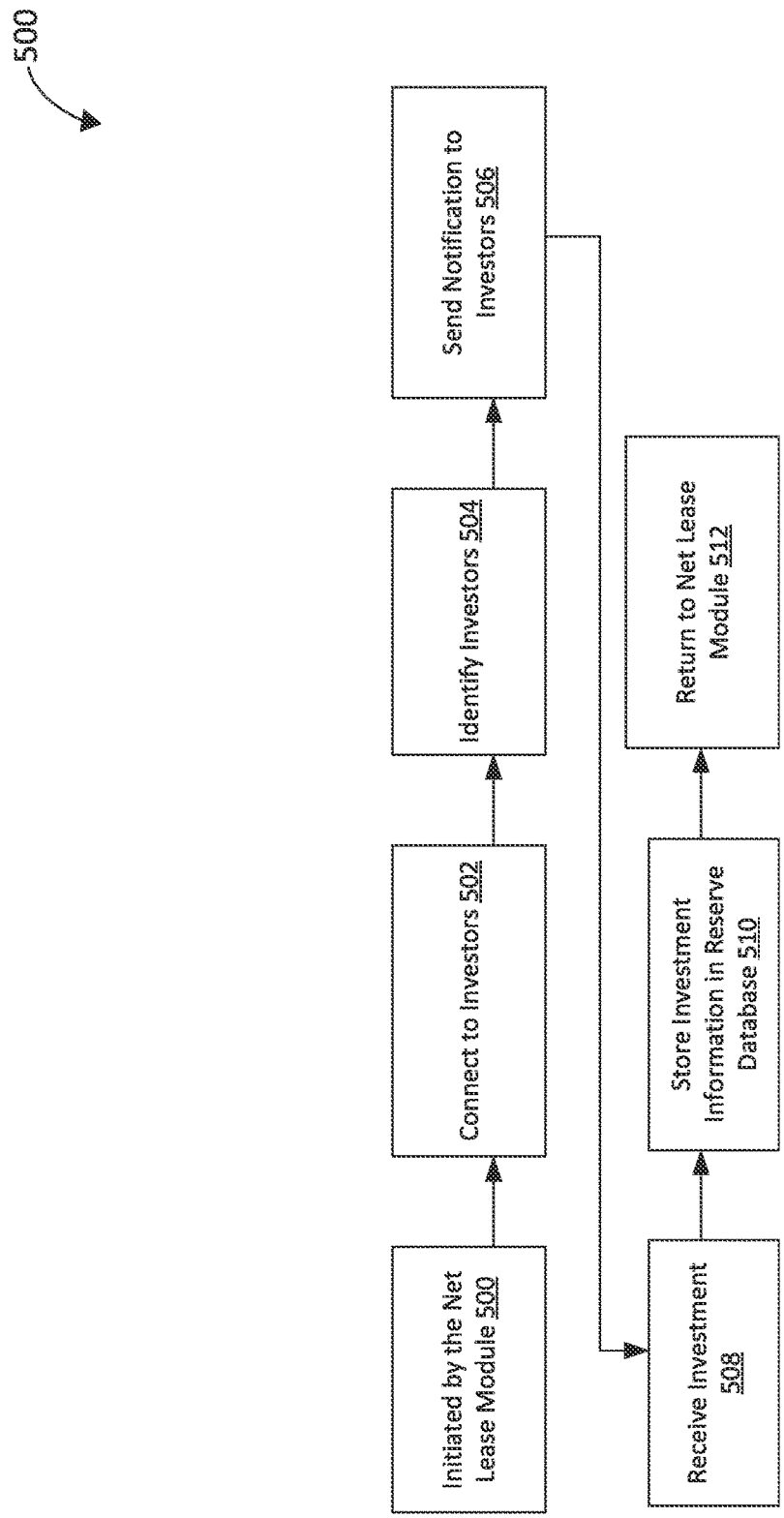
FIG. 5 illustrates an Investor Module in accordance with some aspects of the present technology.

FIG. 5 displays the investor module 110. The process begins with the investor module 110 being initiated, at step 500, by the net lease module 104. In some aspects, the investor module 110 may not need to be initiated and is continuously running in the background of the net lease network 102. The investor module 110 connects, at step 502, to the investors 130. For example, the investor module 110 may connect to the investors 130 through the cloud 138, investors may log in to the net lease network 102, sign up to the net lease network 102, etc. In some aspects, the investor module 110 may provide the investors 130 with certain documents such as income statements, balance sheets, capital requirements, investor agreements, term sheets, business plans, etc.

The investor module 110 identifies, at step 504, potential investors for an investment into the reserve database 124. For example, the investor module 110 may identify potential investors for investment by collecting e-mails of investors that visit the net lease network 102, sign up for the net lease network 102 by creating a username and password, etc. The investor module 110 sends, at step 506, a notification to the investors 130. For example, the investor module 110 may send an e-mail notification through the net lease network 102 to notify the investors. In some aspects, the investor module 110 may provide the investors 130 with certain documents such as income statements, balance sheets, capital requirements, investor agreements, term sheets, business plans, etc.

The investor module 110 receives, at step 508, the investment from the investors 130. For example, the investor module 110 receives an investment from the investor 130, which may include a certain amount of capital to invest in the net lease agreements for residential rental properties. In some aspects, the investor module 110 may send the investor 130 the investment agreement, contract, etc. The investor module 110 stores, at step 510, the received investment from the investors 130 in the reserve database 24. For example, the investor module 110 stores the received investment in the reserve database 124 in which the investors 130 investment is stored as capital in the event that the net lease networks 102 expenses are greater than the returns, or profits from the residential rental properties, to ensure renumeration to the property owners 128 according to the terms of their net lease.

The reserve database 124 may also be used to expand a line of credit for the net lease network 102 to add more residential rental properties to the lease database by attracting more property owners 128. The reserve database 124 may extend debt as an investment to get a return on funds. In some aspects, the reserve database 124 may be stored and managed by a third party, such as a bank or financial institution. In some aspects, the reserve database 124 may be used for unexpected costs such as unexpected vacancy of the residential rental property, capital expenditures, variable costs, etc. The investor module 110 returns, at step 512, to the net lease module 104.

Figure 6:
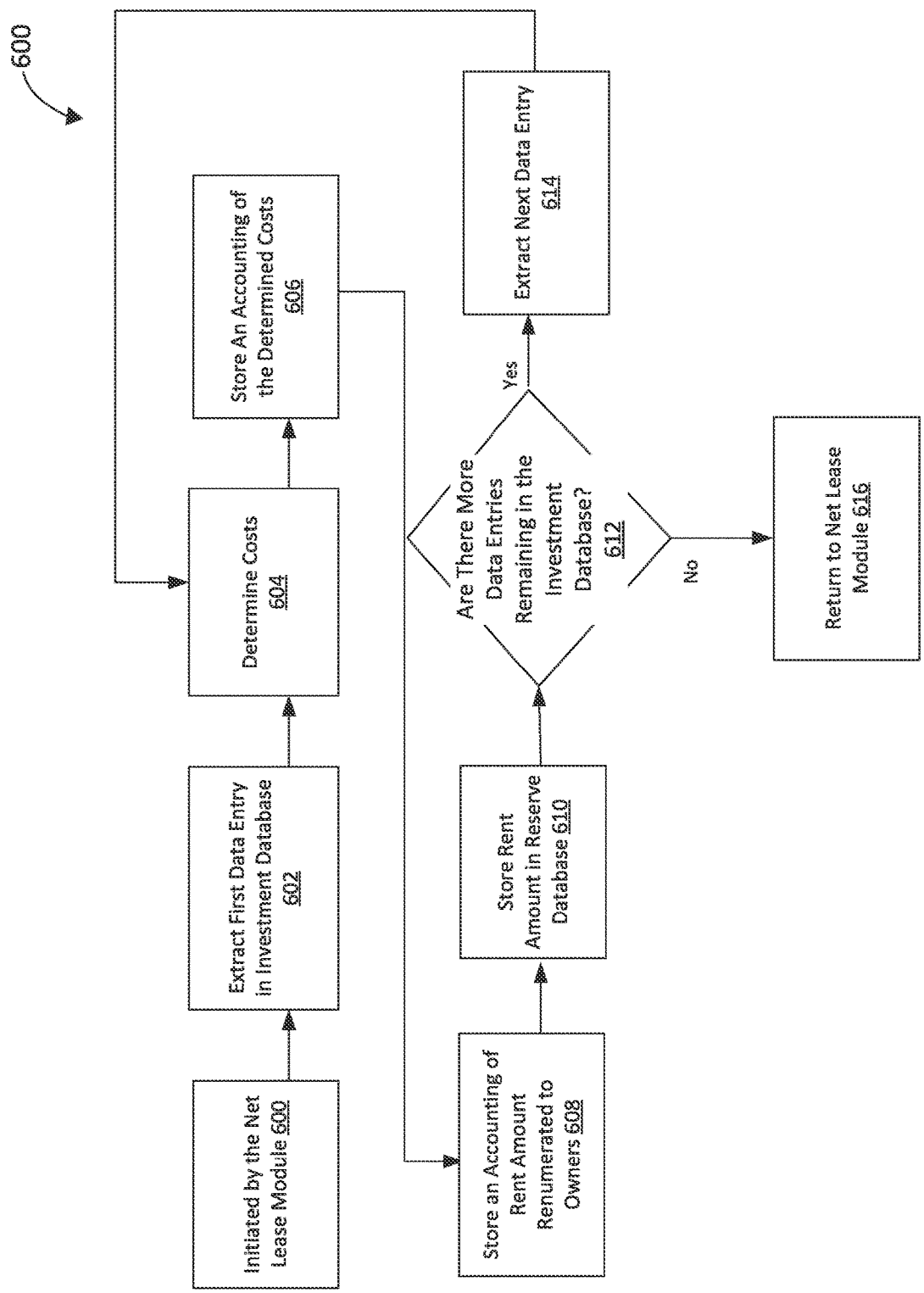
FIG. 6 illustrates a Manage Module in accordance with some aspects of the present technology.

FIG. 6 displays the manage module 112. The process begins with the manage module 112 being initiated, at step 600, by the net lease module 104. In some aspects, the manage module 112 may not need to be initiated and is continuously running in the background of the net lease network 102. The manage module 112 extracts, at step 602, the first data entry in the lease database 118. For example, the manage module extracts the first data entry in the lease database 118, such as the first property, including The manage module 112 determines, at step 604, the fixed and variable costs for the property. For example, the manage module 112 may determine the fixed and variable costs for each property, such as by invoices inputted by vendors 132 or by the property managers 126, extracting the operating expenses from the expense database 116, etc. In some aspects, the property manager 120 may be responsible for sending invoices of each property's fixed and variable costs, and the manage module 112 may extract the funds from the reserve database 124 to pay for the invoices.

The manage module 112 pays, at step 606, the costs of the property. For example, the manage module 112 may manage accounting of costs of the property by sending an accounting for the payment from the reserve database 124 to the vendors 132 or property manager 126. In some aspects, the vendors 132 or property manager 126 may submit invoices to be paid through the net lease network 102, and the manage module 112 may confrim the accounting for the amount remunerated from the reserve database 124 and may send an accounting for the payment to the vendors 132 or property manager 126. The manage module 112 collects, at step 608, rent from the renters 134. For example, the manage module 112 may collect the rent from the residential rental properties by sending a notification to the property manager 126 or receiving a notification from the property manager 126 to determine if the rent for the rental property has been collected for the month.

In some aspects, the property manager 126 may use the manage module 112 or net lease network 102 to collect rent from the tenants, such as by the tenants' signing into the net lease network 102 and sending the payment electronically. The managing module 112 stores, at step 610, the rent in the reserve database 124. For example, the manage module 112 stores that the rent has been collected and stores the amount collected for each rental property in the reserve database 124. In some aspects, the rent may be stored in the reserve database 124 to be used to pay for the rental property's fixed and variable costs.

In some aspects, the reserve database 124 may be used to pay for fixed and variable or variable costs for other rental properties managed by the net lease network 102. In some aspects, the accounting for a rent amount remunerated may be stored in the reserve database 124 by connecting the renter 134 to the net lease network 102 and in some cases, submitting the payment, whereby the accounting for may be automatically transferred to the financial account of the reserve database 124. The manage module 112 determines, at step 612, if there are more data entries remaining in the lease database 118. For example, the manage module 112 extracts the next data entry to pay the costs of the next property and collect rent of the next property until all of the properties in the lease database 118 have paid the associated property costs and collected rent from all of the renters 134. If it is determined that there are more data entries remaining in the lease database 118, the manage module 112 extracts, at step 614, the next data entry from the lease database 118. If it is determined that no more data entries remain in the lease database 118, the manage module 112 returns, at step 616, to the net lease module 104.

Figure 7:
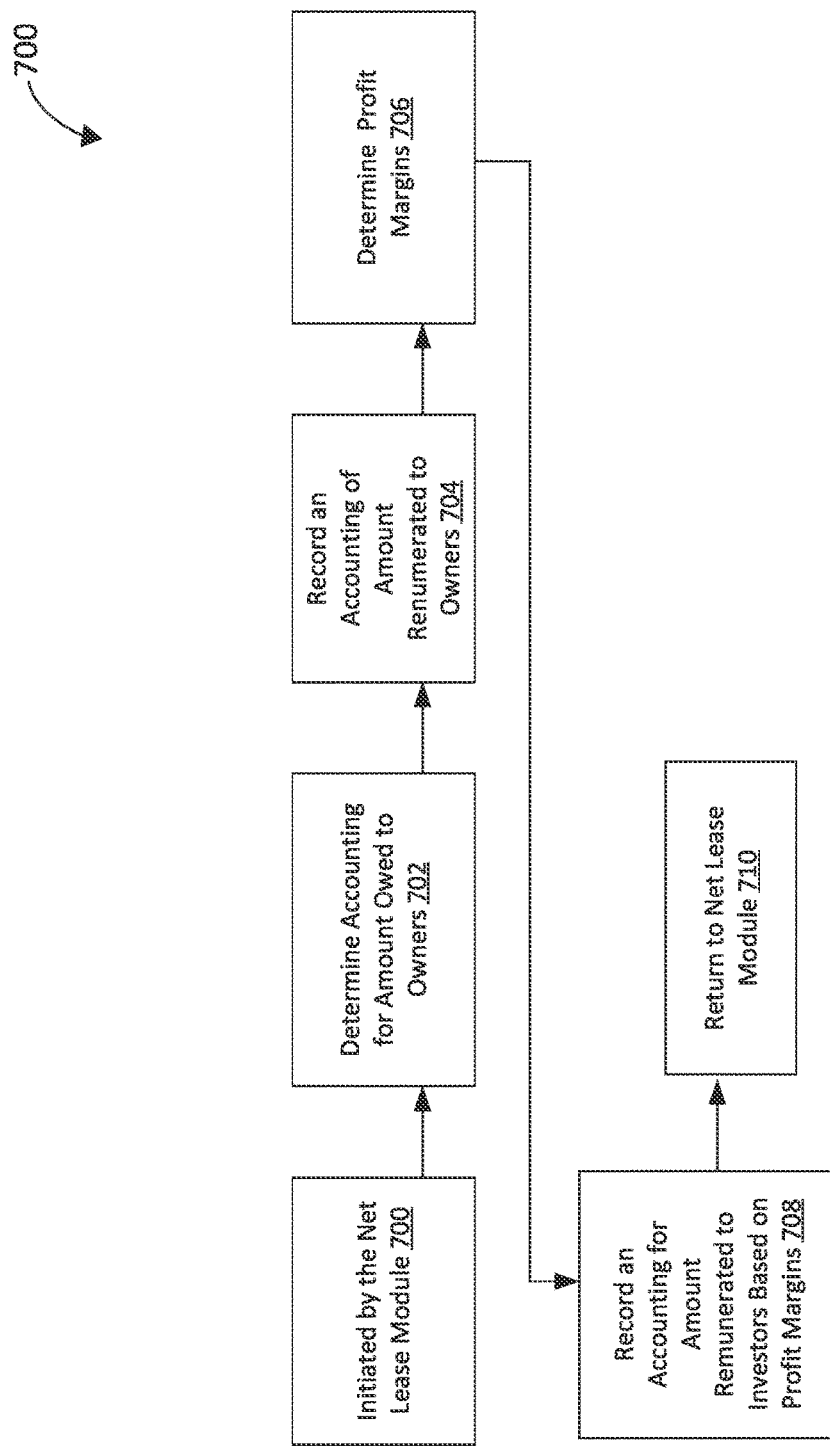
FIG. 7 illustrates an Accounting Module in accordance with some aspects of the present technology.

FIG. 7 displays the accounting module 114. The process begins with the accounting module 114 being initiated, at step 700, by the net lease module 104. In some aspects, the accounting module 114 may not need to be initiated and is continuously running in the background of the net lease network 102. The accounting module 114 determines, at step 702, the payment to the property owners 128. For example, the accounting module 114 may determine the payment to the property owner 128 by extracting the net lease payment from the lease database 118 and extracting the amount from the reserve database 124 to send to the property owner 128.

In some aspects, if a property owner 128 has multiple properties on the net lease network 102, the accounting module 114 may filter the lease database 118 on the property owner 128 ID and determine the sum of all the net lease payments owed to the property owner 128 and extract the funds from the reserve database 124 to send to the property owner 128. In some aspects, if there is a plurality of property owners 128, the accounting module 114 may extract a first property owner 128 and determine the payment, send the payment, and then select the next property owner 128 until all the property owners 128 are stored in the lease database 118 are paid. In some aspects, the payments may be determined by the net lease terms and sent based on a specific schedule, may be paid out monthly, quarterly, annually, etc.

The accounting module 114 records, at step 704, an accounting of an amount remunerated to the property owners 128. For example, the accounting module 114 may send the net lease payment to the property owner 128 by extracting the amount owed to the property owner 128 from the reserve database 124 and sending the payment electronically to the property owner 128. The accounting module 114 determines, at step 706, the profits of the residential investments. For example, the accounting module 114 may determine the profits of the residential investments by extracting the payment to the property owners 128, the cost of the properties, and the rent collected on the property. Then the accounting module 114 may add the payment to the property owners and the cost of the property together and subtract the total from the rent collected to determine the monthly profit of the property. The accounting module 114 may add the sum of all the profits for the residential rental properties to determine the total profit. In some aspects, the profits may be stored in the lease database 118.

In some aspects, the profits may be determined monthly, quarterly, annually, etc. The accounting module 114 sends, at step 708, the profits of the residential investments to the investors 130. For example, the accounting module 114 may send the profits to investors 130 that had invested in the net lease network 102. For example, the investors 130 may have a certain percentage of profits they are entitled to based upon their investor agreement. For example, if an investor 130 agreed to invest $1,000 for 1% of the profits and the total monthly profits were $4,000, then the investor 130 would be entitled to $40 for the monthly profits. In some aspects, the investor agreements may be stored in the net lease network 102. In some aspects, the accounting module 114 may extract each investor 130 agreement and the percentages of the profits that they are owed and extract the amount from the reserve database 124 to pay the investors 130 their return on investment. In some aspects, the investors 130 may be paid out monthly, quarterly, annually, etc. The accounting module 114 returns, at step 710, to the net lease module 104.

FIG. 8 displays the expenses database 116. The database may contain the location of where the market data is for, the starting market rent, the market growth rate, the inflation rate, the vacancy rate, the rent collectability rate, the home price appreciation, and the operating expenses, which are stored as a data file and may contain the local taxes, the insurance rates, the management fees, the maintenance budget, the homeowners association fees, the cost of utilities, and the asset management fees. In some aspects, the market data may be for a specific location or region or may be specific to a certain property location.

In some aspects, each of the data points stored in the database may be used as an input into an algorithm, such as a machine-learning algorithm, to determine the net lease terms for the property owner 128, determine the rent for the specific property, and determine the profits or return on investment for the investors 130. In some aspects, the starting market price may be the cost per square footage, the average cost of rent in a certain location, the average cost of rent in a certain location based on the number of bedrooms, the average cost of rent in a certain region of a city or town, etc. In some aspects, the net lease module 104 may send a request to the expenses network 136 to receive relevant data points for a specific property location, for example, by using the mailing address.

In some aspects, a set of net lease terms associated with the at least one of the identified properties may be generated based on inputs including the determined fixed and variable costs. The machine-learning algorithm may output the set of net lease terms and weighted averages may be assigned to each input. The machine-learning algorithm may determine the weights based on training data including past net lease terms associated with the specific region.

FIG. 9 displays the lease database 118. The database contains a property owner ID, the property ID, the length of the lease or the years remaining on the net lease, the lease payment to the property owner 128, the annual increase of the net lease payment to the property owner, the fixed and variable costs per month for the property, the rent collected per month for the property, and the monthly profits for the property. In some aspects, a property owner 128 may have multiple properties under a net lease with the net lease network 102. In some aspects, the fixed and variable costs may differ for each property, or if there are multiple properties located within a certain radius, there may be one vendor 132 and/or one property manager 126 for each of the properties to lower the monthly fixed and variable costs. In some aspects, the database may be shown as monthly, quarterly, or annual payments, expenses, profits, etc. In some aspects, the investors 130 may receive a percentage of the monthly profits or may be paid out based on quarterly or annual profits.

FIG. 10 displays the owner's database 120. The database contains the list of owners interested in receiving net lease terms from the net lease network 102. The database contains the owner's name, the owner ID, the property ID, the property address, the square footage, the number of bedrooms, and the number of bathrooms. In some aspects, the owner may send the net lease network 102 more data on the location, such as average utility bills, property tax, insurance costs, condition of the property, condition of current appliances, etc. In some aspects, the owner may send the net lease network 102 the current rates they charge for rent, if the property is vacant or if it currently has renters, the application process the owner uses for renters, etc.

FIG. 11 displays the parameters database 122. The database contains the parameters created during the process described in the reserve module 106 used to determine if a potential property would be profitable for a residential net lease from the net lease network 102. The database contains the location or region, the square foot range of the property, the number of bedrooms, the number of bathrooms, the rent range that could be charged for the property, the average range of fixed and variable costs for the property, and the potential profit range of the property. In some aspects, the database may contain a plurality of locations based on the region of the country, the state the property resides in, the city where the property is located, the town or section of a city the property is located, etc. In some aspects, the parameters may be determined by the property's square footage, the number of bedrooms the property has, the rent that may be charged for the residential property, or a combination of the parameters.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed aspects.

Figure 12:
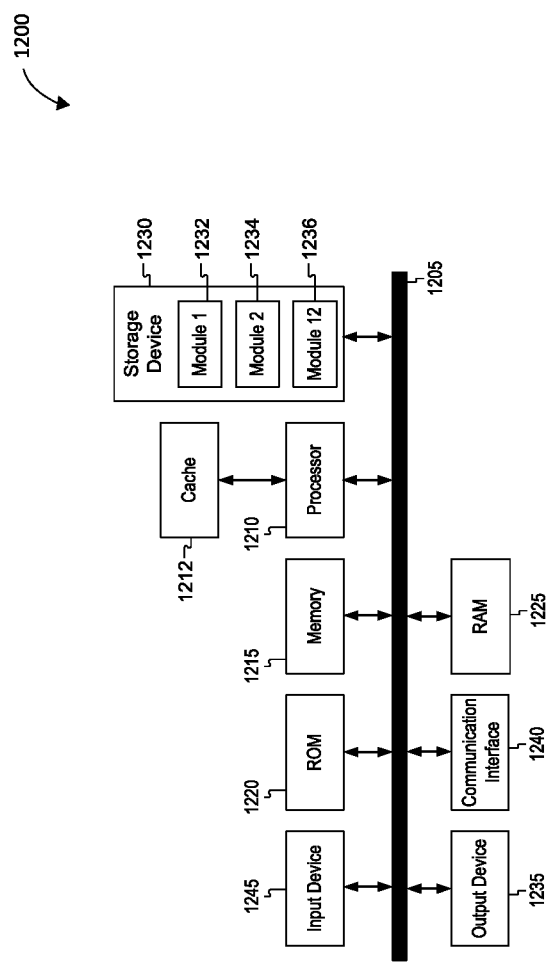
FIG. 12 shows an example system for implementing certain aspects of the present technology.

FIG. 12 shows an example system for implementing certain aspects of this disclosure of the present technology, which can be for example any computing device making up the net lease network 102 or the net lease system 100, or any component thereof in which the components of the system are in communication with each other using connection 1205. Connection 1205 can be a physical connection via a bus, or a direct connection into processor 1210, such as in a chipset architecture. Connection 1205 can also be a virtual connection, networked connection, or logical connection.

In some aspects, computing system 1200 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement, and therefore the basic features here may easily be substituted for improved hardware or firmware arrangements as they are developed.

Storage device 1230 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1230 can include software services, servers, services, etc., that when the code that defines such software is executed by the processor 1210, it causes the system to perform a function. In some aspects, a hardware service that performs a particular function can include the software component stored in a computer-readable medium in connection with the necessary hardware components, such as processor 1210, connection 1205, output device 1235, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method of automating a residential net lease management tool, comprising:
    receiving, over an expense network, market data associated with a specific region sent over a communication network at a net lease management server configured to communicate with at least one third-party application;
    initiating, by a net lease module, a reserve module;
    generating, by the reserve module, net lease parameters for the specific region based on a calculated profitability evaluation based on the market data received via the expense network, wherein the calculated profitability evaluation determines a threshold margin based on a percentage of an average rental rate and average fixed costs in the specific region;
    initiating, by the net lease module, an owner module;
    identifying, by the owner module, properties that fall within the net lease parameters generated by the reserve module;
    initiating, by the net lease module, a manage module;
    determining, by the manage module, fixed costs and variable costs based on data associated with at least one of the identified properties and extracted data points from stored invoice data;
    generating, by the reserve module, a set of net lease terms associated with the at least one of the properties identified by the net lease module, based on inputs including the fixed costs and variable costs determined the manage module, wherein weights are assigned to each input;
    storing, by the net lease module in a lease database, the net lease terms;
    recording, by an accounting module in a reserve database associated with a single reserve fund, a first accounting for a first amount funded by one or more investors that are not the respective owners;
    recording, by the accounting module in the reserve database associated with the single reserve fund, a second accounting for a second amount remunerated for fixed costs based on the net lease terms stored at the lease database, wherein the fixed costs include at least one of property management, property taxes, property insurance, or property maintenance;
    recording, by the accounting module in the reserve database associated with the single reserve fund, a third accounting for a third amount remunerated to the respective owners for the identified properties and collected from respective tenants per a rent schedule based on the net lease terms stored at the lease database;
    recording, by the accounting module in the reserve database associated with the single reserve fund, a fourth accounting for a fourth amount remunerated to the investors based on determined profit margins over term of lease and the net lease terms stored at the lease database; and
    sending, based upon the accountings of the reserve database over the communication network, an instruction to trigger a transfer to the single reserve fund.

2. The computer-implemented method of claim 1, wherein a machine-learning algorithm is used to output the set of net lease terms, and wherein the machine-learning algorithm determines the weights based on training data including past net lease terms associated with the specific region.

3. The computer-implemented method of claim 1, wherein the market data includes at least one of starting market rent, market growth rate, inflation rate, vacancy rate, rent collectability rate, home price appreciation, operating expenses, local taxes, insurance rates, management fees, maintenance budget, homeowner's association fees, cost of utilities, or asset management fees.

4. The computer-implemented method of claim 1, wherein the inputs include at least one of average rent in the specific region, square footage of the respective property, market growth rate, inflation rate, vacancy rate, rent collectability rate, home price appreciation, or operating expenses.

5. The computer-implemented method of claim 1, further comprising:
    sending a notification to the identified one or more owners regarding the one or more properties; and
    receiving an approval from one of the owners to generate a contractual agreement document associated with one of the properties.

6. The computer-implemented method of claim 1, further comprising:
    receiving market data associated with a different region sent over the communication network at the net lease management server;
    generating a second set of net lease parameters for the different region based on the calculated profitability evaluation that determines the respective threshold margin;
    identifying one or more second owners with one or more second properties that fall within the second set of net lease parameters;
    determining a second set of fixed costs and variable costs based on data associated with the one of the second properties and extracted data points from stored invoices of associated vendors; and
    generating a second set of net lease terms associated with the one of the second properties based on the determined second set of fixed costs and variable costs, using a machine-learning algorithm that outputs the second set of net lease terms.

7. A system for automating a residential net lease agreement documentation process between investors, owners of rental properties, and renters, comprising:

a storage configured to store instructions;
a net lease module that controls a reserve module, an owner module, a manage module, and an accounting module;
the reserve module that generates a plurality of net lease parameters for different regions;
the owner module that identifies properties that fall within a particular net lease parameter;
the manage module that determines fixed costs and variable costs;
the accounting module that records accountings; and
one or more processors configured to execute the instructions and cause the one or more processors to:
receiving, over an expense network, market data associated with a specific region sent over a communication network at a net lease management server configured to communicate with at least one third-party application;
generating, by the reserve module, net lease parameters for the specific region based on a calculated profitability evaluation based on the market data received via the expense network, wherein the calculated profitability evaluation determines a threshold margin based on a percentage of an average rental rate and average fixed costs in the specific region;
identifying, by the owner module, properties that fall within the net lease parameters generated by the reserve module;
determining, by the manage module, fixed costs and variable costs based on data associated with at least one of the identified properties and extracted data points from stored invoice data;
generating, by the reserve module, a set of net lease terms associated with the at least one of the properties identified by the net lease module, based on inputs including the fixed costs and variable costs determined the manage module, wherein weights are assigned to each input;
storing, by the net lease module in a lease database, the net lease terms;
recording, by the accounting module in a reserve database associated with a single reserve fund, a first accounting for a first amount funded by one or more investors that are not the respective owners;
recording, by the accounting module in the reserve database associated with the single reserve fund, a second accounting for a second amount remunerated for fixed costs based on the net lease terms stored at the lease database;
recording, by the accounting module in the reserve database associated with the single reserve fund, a third accounting for a third amount remunerated to the respective owners for the identified properties and collected from respective tenants per a rent schedule based on the net lease terms stored at the lease database;
recording, by the accounting module in the reserve database associated with the single reserve fund, a fourth accounting for a fourth amount remunerated to the investors based on determined profit margins over term of lease and the net lease terms stored at the lease database; and
sending, based upon the accountings of the reserve database, an instruction to trigger a transfer to the single reserve fund.

8. The system of claim 7, wherein the processor is configured to execute the instructions and cause the one or more processors to:
record an accounting for an amount remunerated for fixed costs, wherein the fix costs includes at least one of property management, property taxes, property insurance, or property maintenance.

9. The system of claim 7, wherein the market data includes at least one of starting market rent, market growth rate, inflation rate, vacancy rate, rent collectability rate, home price appreciation, operating expenses, local taxes, insurance rates, management fees, maintenance budget, homeowner's association fees, cost of utilities, or asset management fees.

10. The system of claim 7, wherein the inputs include at least one of average rent in the specific region, square footage of the respective property, market growth rate, inflation rate, vacancy rate, rent collectability rate, home price appreciation, or operating expenses.

11. The system of claim 7, wherein the one or more processors is configured to execute the instructions and cause the one or more processors to:
send a notification to the identified one or more owners regarding the one or more properties; and
receive an approval from one of the owners to generate a contractual agreement document associated with one of the properties.

12. The system of claim 7, wherein the one or more processors is configured to execute the instructions and cause the one or more processors to:
receive market data associated with a different region sent over the communication network at the net lease management server;
generate a second set of net lease parameters for the different region based on the calculated profitability evaluation that determines the respective threshold margin;
identify one or more second owners with one or more second properties that fall within the second set of net lease parameters;
determine a second set of fixed costs and variable costs based on data associated with the one of the second properties and extracted data points from stored invoices of associated vendors; and
generate a second set of net lease terms associated with the one of the second properties based on the determined second set of fixed costs and variable costs, use a machine-learning algorithm that outputs the second set of net lease terms.

13. A non-transitory computer readable medium comprising instructions, the instructions, when executed by a computing system, cause the computing system to:
receive, over an expense network, market data associated with a specific region sent over a communication network at a net lease management server configured to communicate with at least one third-party application;
generating, by a reserve module, net lease parameters for the specific region based on a calculated profitability evaluation based on the market data received via the expense network, wherein the calculated profitability evaluation determines a threshold margin based on a percentage of an average rental rate and average fixed costs in the specific region;
identifying, by an owner module, properties that fall within the net lease parameters generated by the reserve module;

determining, by a manage module, fixed costs and variable costs based on data associated with at least one of the identified properties and extracted data points from stored invoice data;

generating, by the reserve module, a set of net lease terms associated with the at least one of the properties identified by the net lease module, based on inputs including the fixed costs and variable costs determined the manage module, wherein weights are assigned to each input;

storing, by a net lease module in a lease database, the net lease terms;

recording, by an accounting module in a reserve database associated with a single reserve fund, a first accounting for a first amount funded by one or more investors that are not the respective owners;

recording, by the accounting module in the reserve database associated with the single reserve fund, a second accounting for a second amount remunerated for fixed costs based on the net lease terms stored at the lease database, wherein the fixed costs include at least one of property management, property taxes, property insurance, or property maintenance;

recording, by the accounting module in the reserve database associated with the single reserve fund, a third accounting for a third amount remunerated to the respective owners for the identified properties and collected from respective tenants per a rent schedule based on the net lease terms stored at the lease database;

recording, by the accounting module in the reserve database associated with the single reserve fund, a fourth accounting for a fourth amount remunerated to the investors based on determined profit margins over term of lease and the net lease terms stored at the lease database; and sending, based upon the accountings of the reserve database, an instruction to trigger a transfer to the single reserve fund.

14. The computer readable medium of claim 13, wherein the computer readable medium further comprises instructions that, when executed by the computing system, cause the computing system to:

receive electronic signatures for a contractual agreement document that is auto-populated based on approved net lease terms; and generate a digitally-printed and signed version of the contractual agreement document.

* * * * *